US012681483B2

(12) United States Patent
Ikeda et al.

(10) Patent No.: US 12,681,483 B2
(45) Date of Patent: Jul. 14, 2026

(54) REMOTE CONTROL DEVICE, CONTROL DEVICE, AND CONTROL METHOD

(71) Applicant: TOYOTA JIDOSHA KABUSHIKI KAISHA, Toyota (JP)

(72) Inventors: Keigo Ikeda, Nisshin (JP); Yasuhiro Saito, Toyoake (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 18/672,185

(22) Filed: May 23, 2024

(65) Prior Publication Data

US 2024/0402712 A1 Dec. 5, 2024

(30) Foreign Application Priority Data

May 31, 2023 (JP) ................................. 2023-089425
Dec. 5, 2023 (JP) ................................. 2023-205369

(51) Int. Cl.
*G05D 1/00* (2024.01)
*G05D 1/221* (2024.01)
*G05D 1/65* (2024.01)
*G06T 7/70* (2017.01)
*G05D 109/10* (2024.01)

(52) U.S. Cl.
CPC .............. *G05D 1/221* (2024.01); *G05D 1/65* (2024.01); *G06T 7/70* (2017.01); *G05D 2109/10* (2024.01); *G06T 2207/10028* (2013.01); *G06T 2207/30252* (2013.01)

(58) Field of Classification Search
CPC ...... G05D 1/221; G05D 1/65; G05D 2107/70; G05D 2109/10; G06T 7/70; G06T 2207/10028; G06T 2207/30252
USPC .......................................................... 701/2
See application file for complete search history.

(56) References Cited

U.S. PATENT DOCUMENTS

| | | | | |
|---|---|---|---|---|
| 2008/0075326 A1* | 3/2008 | Otani | ...................... | G01S 17/86 |
| | | | | 382/106 |
| 2017/0320529 A1 | 11/2017 | Nordbruch | | |
| 2019/0012808 A1* | 1/2019 | Mou | ........................ | G08G 1/16 |
| 2021/0025998 A1* | 1/2021 | Huber | .................... | G05D 1/646 |
| 2021/0141092 A1* | 5/2021 | Chen | .................... | G01S 13/867 |

(Continued)

FOREIGN PATENT DOCUMENTS

| | | |
|---|---|---|
| JP | 2017-538619 A | 12/2017 |
| JP | 2022-515809 A | 2/2022 |
| JP | 2022-124865 A | 8/2022 |

*Primary Examiner* — Tiffany P Young

(74) *Attorney, Agent, or Firm* — Sughrue Mion, PLLC

(57) ABSTRACT

A remote control device that generates a control command for remote control of a movable body is provided. The remote control device uses measurement results of a plurality of distance measurement devices, and sends the control command to the movable body. The remote control device specifies one or more processing-object distance measurement devices from the plurality of distance measurement devices, and each of the processing-object distance measurement devices is a distance measurement device that is used in estimating at least one of the position and orientation of the movable body. The remote control device executes the estimating using three-dimensional point cloud data that is obtained through measurement by the processing-object distance measurement devices.

9 Claims, 9 Drawing Sheets

(56) References Cited

U.S. PATENT DOCUMENTS

| | | |
|---|---|---|
| 2021/0394747 A1 | 12/2021 | Li et al. |
| 2022/0260997 A1 | 8/2022 | Iio et al. |

* cited by examiner

FIG. 3A

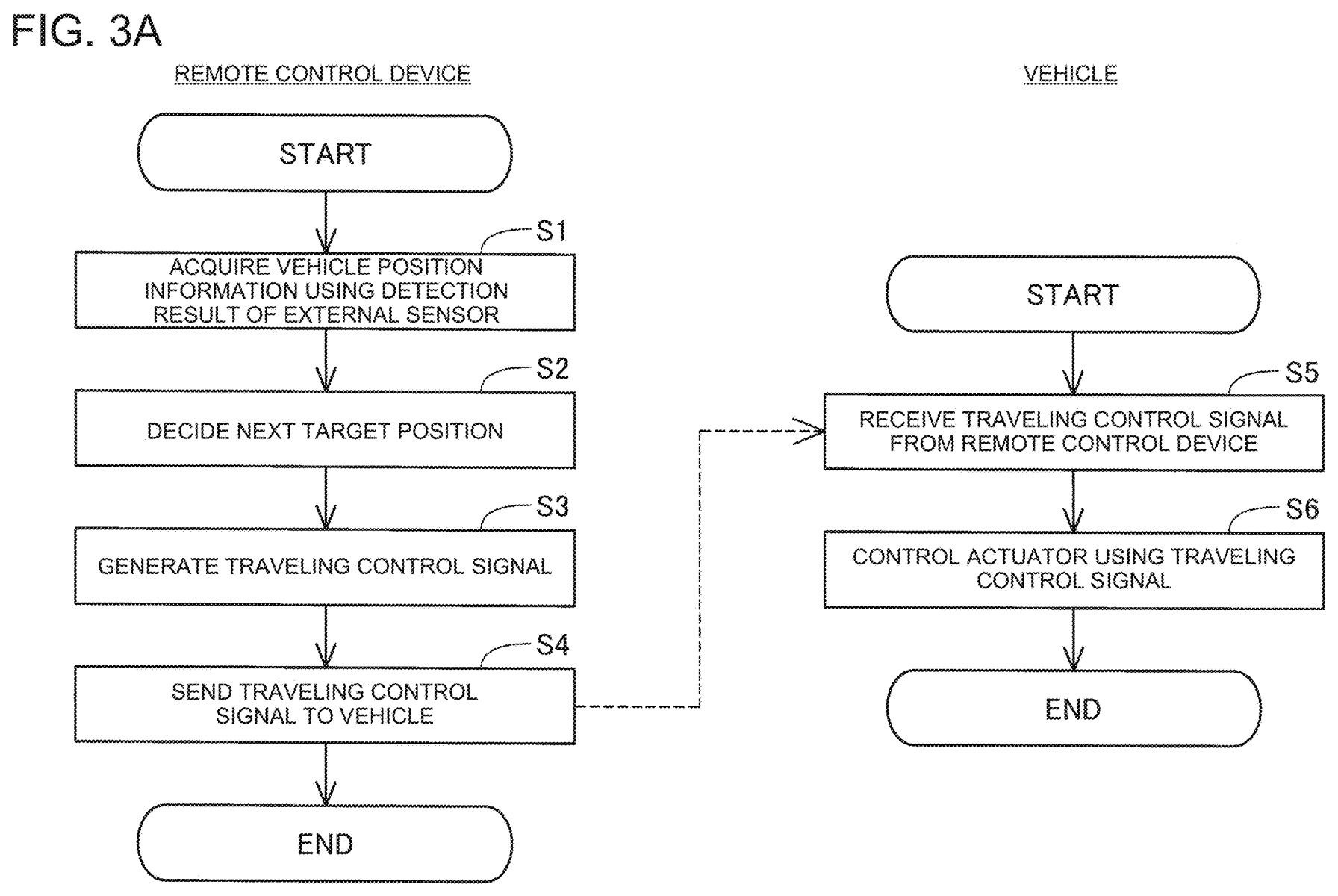

REMOTE CONTROL DEVICE

START

S1 — ACQUIRE VEHICLE POSITION INFORMATION USING DETECTION RESULT OF EXTERNAL SENSOR

S2 — DECIDE NEXT TARGET POSITION

S3 — GENERATE TRAVELING CONTROL SIGNAL

S4 — SEND TRAVELING CONTROL SIGNAL TO VEHICLE

END

VEHICLE

START

S5 — RECEIVE TRAVELING CONTROL SIGNAL FROM REMOTE CONTROL DEVICE

S6 — CONTROL ACTUATOR USING TRAVELING CONTROL SIGNAL

END

REMOTE CONTROL DEVICE, CONTROL DEVICE, AND CONTROL METHOD

CROSS-REFERENCE TO RELATED APPLICATION

This application claims priority to Japanese Patent Application No. 2023-089425 filed on May 31, 2023 and Japanese Patent Application No. 2023-205369 filed on Dec. 5, 2023, each incorporated herein by reference in its entirety.

BACKGROUND

1. Technical Field

The present disclosure relates to a remote control device, a remote control device, a movable body, a control system, and a control method.

2. Description of Related Art

There is known a technology in which a vehicle is caused to travel by remote control in the manufacturing process of the vehicle (for example, Japanese Unexamined Patent Application Publication (Translation of PCT application) No. 2017-538619).

SUMMARY

When a movable body is moved by the remote control, processing of estimating the position and orientation of the movable body is executed. The position and orientation of the movable body is estimated using three-dimensional point cloud data that is acquired using a distance measurement device such as a camera and a radar. In the estimation processing, a short-cycle calculation is necessary for the stabilization of the traveling control of the movable body. However, there is a trade-off relation between the estimation accuracy for the position and orientation of the movable body and the processing time, and therefore, it is desirable to keep balance between the estimation accuracy and the processing time depending on the situation.

The present disclosure can be realized as the following modes.

A first aspect of the present disclosure provides a remote control device that generates a control command for remote control of a movable body, using measurement results of a plurality of distance measurement devices, and that sends the control command to the movable body. The remote control device includes, one or more memories, and one or more processors in communication with the one or more memories, configured to perform processes. The processes include specifying one or more processing-object distance measurement devices from the plurality of distance measurement devices, each of the processing-object distance measurement devices being a distance measurement device that is used in estimation processing of estimating at least one of the position and orientation of the movable body, and executing the estimating using three-dimensional point cloud data that is obtained through measurement by the processing-object distance measurement devices.

This remote control device specifies the processing-object distance measurement device that is used in the estimating, and executes the estimating using the processing-object distance measurement device, and therefore, it is possible to prioritize one of the estimation accuracy and the processing speed depending on the situation.

In the above remote control device, the processes may further include increasing the number of the processing-object distance measurement devices, compared to when the required accuracy is a second level that is lower than the first level when a required accuracy of the remote control is a first level.

With this remote control device, the processor increases the number of processing-object distance measurement devices, when the required accuracy of the remote control is high, and therefore, it is possible to restrain the decrease in estimation accuracy compared to when the required accuracy is high.

In the above remote control device, the processes may further include deciding the number of the processing-object distance measurement devices, depending on the traveling situation of the movable body.

With this remote control device, the processor decides the number of processing-object distance measurement devices, depending on the traveling situation of the movable body, and therefore, it is possible to prioritize one of the estimation accuracy and the processing speed depending on the traveling situation of the movable body.

In the above remote control device, the processes may further include repeatedly executing the estimating by performing matching between the three-dimensional point cloud data and a template point cloud, and increasing the number of the processing-object distance measurement devices, compared to the number of the processing-object distance measurement devices in the last matching, when a coincidence degree of the matching in the estimating is a threshold or less.

With this remote control device, the device specification unit increases the number of processing-object distance measurement devices, when the coincidence degree of the matching is low, and therefore, it is possible to restrain the decrease in estimation accuracy when the coincidence degree of the matching is low.

In the above remote control device, the processes may further include repeatedly executing the estimating by performing matching between the three-dimensional point cloud data and a template point cloud, and increasing the number of the processing-object distance measurement devices, compared to the number of the processing-object distance measurement devices in the last matching, when a reliability degree of the matching in a preset number of times of the estimating is a threshold or less.

With this remote control device, the device specification unit increases the number of processing-object distance measurement devices, when the reliability degree of the matching is low, and therefore, it is possible to restrain the decrease in estimation accuracy when the reliability degree of the matching is low. Further, the device specification unit increases the number of processing-object distance measurement devices when the reliability degree of the matching in the preset number of times of the estimation processing is the threshold or less, and therefore, it is possible to restrain the number of processing-object distance measurement devices from being frequently altered and restrain the processing by the remote control device from being complicated, compared to a configuration in which the number of processing-object distance measurement devices is altered depending on the result of the matching in each estimation processing.

In the above remote control device, the processes may further include decreasing the movement velocity of the movable body when the device specification unit increases the number of the processing-object distance measurement devices.

With this remote control device, when the number of processing-object distance measurement devices is increased, the movement velocity of the movable body is decreased, and thereby, the movement amount of the movable body during the execution of the estimation processing is restrained. Therefore, it is possible to reduce the possibility of the occurrence of a problem in the traveling of the movable body.

A second aspect of the present disclosure provides a control device that generates a control command for controlling a movable body, using measurement results of a plurality of distance measurement devices. The control device includes one or more memories, and one or more processors in communication with the one or more memories, configured to perform processes. The processes include specifying one or more processing-object distance measurement devices from the plurality of distance measurement devices, each of the processing-object distance measurement devices being a distance measurement device that is used in estimating at least one of the position and orientation of the movable body; and executing the estimating using three-dimensional point cloud data that is obtained through measurement by the processing-object distance measurement devices.

This control device specifies the processing-object distance measurement device that is used in the estimation processing, and executes the estimation processing using the processing-object distance measurement device, and therefore, it is possible to prioritize one of the estimation accuracy and the processing speed depending on the situation.

A third aspect of the present disclosure provides a control method for controlling a movable body using measurement results of a plurality of distance measurement devices. The control method includes specifying, by one or more processors, one or more processing-object distance measurement devices from the plurality of distance measurement devices, each of the processing-object distance measurement devices being a distance measurement device that is used in estimating at least one of the position and orientation of the movable body; and executing, by one or more processors, the estimating using three-dimensional point cloud data that is obtained through measurement by the processing-object distance measurement devices.

In this control method, the processing-object distance measurement device that is used in the estimation processing is specified, and the estimation processing is executed using the processing-object distance measurement device. Therefore, it is possible to prioritize one of the estimation accuracy and the processing speed depending on the situation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a flowchart showing a procedure of a traveling control in the first embodiment;

DETAILED DESCRIPTION OF EMBODIMENTS

A. First Embodiment

Figure 1:
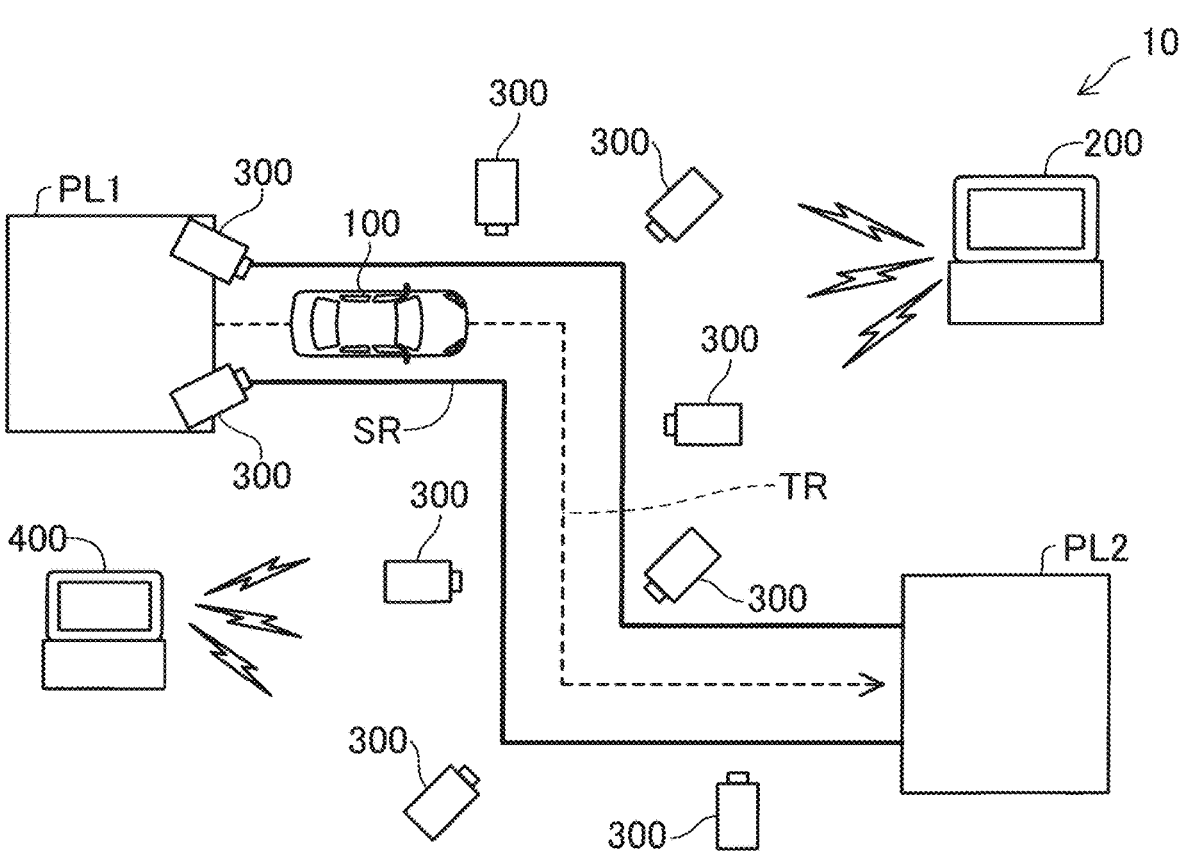
FIG. 1 is an explanatory diagram showing a schematic configuration of a remote control system in which a remote control device in a first embodiment is applied.

FIG. 1 is an explanatory diagram showing a schematic configuration of a remote control system 10 in which a remote control device 200 in a first embodiment is applied. The remote control system 10 includes one or more vehicles 100 as exemplary movable bodies, a remote control device 200 that generates a control command for the remote control of each vehicle 100 and that sends the control command to the vehicle 100, a plurality of distance measurement device 300 that measures three-dimensional point cloud data about the vehicle 100, and a process management device 400 that manages the manufacturing process of the vehicle 100. The remote control system 10 corresponds to the "control system" in the present disclosure. Further, in the embodiment, the remote control device 200 corresponds to the "control device" in the present disclosure.

In the embodiment, the vehicle 100 is configured as a battery electric vehicle (BEV).

In the present disclosure, the "movable body" means a physical body that can move, and for example, is a vehicle or an electric vertical takeoff and landing aircraft (a so-called flying vehicle). The vehicle may be a vehicle that travels using wheels, or may be a vehicle that performs caterpillar traveling, and for example, is a passenger car, a track, a bus, a two-wheeled vehicle, a four-wheeled vehicle, a tank, a construction vehicle, or the like. The vehicle includes a battery electric vehicle (BEV), a gasoline vehicle, a hybrid electric vehicle, and a fuel cell electric vehicle. In the case where the movable body is other than the vehicle, the expression "vehicle" and the expression "car" in the present disclosure can be replaced with "movable body" when appropriate, and the expression "traveling" can be replaced with "moving" when appropriate.

The vehicle 100 is configured to be capable of traveling by unmanned driving. The "unmanned driving" means a driving that does not depend on the traveling operation by an occupant. The traveling operation means an operation relevant to at least one of "running", "turning", and "stopping" of the vehicle 100. The unmanned driving is realized by an automatic or manual remote control that uses a device positioned in the exterior of the vehicle 100, or by an autonomous control of the vehicle 100. An occupant that does not perform the traveling operation may ride in the vehicle 100 that travels by unmanned driving. Examples of the occupant that does not perform the traveling operation include a person that merely sits on a seat of the vehicle 100, and a person that performs, in the vehicle 100, a work different from the traveling operation, as exemplified by attachment, inspection, or the operation of switches. The driving that depends on the traveling operation by the occupant is sometimes called "manned driving".

In the present specification, the "remote control" is a "full remote control" in which all of actions of the vehicle 100 are fully decided from the exterior of the vehicle 100, and a "partial remote control" in which some of the actions of the vehicle 100 are decided from the exterior of the vehicle 100. Further, the "autonomous control" includes a "full autonomous control" in which the vehicle 100 autonomously controls its action without receiving information from the device in the exterior of the vehicle 100 at all, and a "partial autonomous control" in which the vehicle 100 autonomously controls its action using information received from the device in the exterior of the vehicle 100.

In the embodiment, the remote control of the vehicle 100 is executed in a factory where the vehicle 100 is manufactured. The reference coordinate system of the factory is a global coordinate system, and an arbitrary position in the factory can be expressed as X-Y-Z coordinates in the global coordinate system. The factory includes a first place PL1 and a second place PL2. The first place PL1 is a place where the assembly of the vehicle 100 is executed, for example, and the second place PL2 is a place where the inspection of the vehicle 100 is executed, for example. The first place PL1 and the second place PL2 are connected by a traveling road SR along which the vehicle 100 can travel.

A plurality of distance measurement devices 300 that adopts the vehicle 100 as the measurement object is installed in the periphery of the traveling road SR. The distance measurement device 300 is an external sensor that is positioned in the exterior of the vehicle 100. As the external sensor, without being limited to the distance measurement device 300, various sensors may be installed in the periphery of the traveling road SR. The external sensor includes a communication device (not illustrated), and can communicate with other devices such as the vehicle 100 and the remote control device 200 by wire communication or wireless communication. The remote control device 200 can acquire the position and orientation of the vehicle 100 relative to a target route TR, in real time, using three-dimensional point cloud data measured by each distance measurement device 300. The distance measurement device 300 in the embodiment can perform switching between the execution and stop of the acquisition of the three-dimensional point cloud data, by receiving a control command from the remote control device 200. As the distance measurement device 300, a camera and a light detection and ranging (LiDAR) can be used. Particularly, the LiDAR is preferable because highly-accurate three-dimensional point cloud data is obtained. It is preferable that the plurality of distance measurement devices 300 be disposed such that the vehicle 100 can be always measured by two or more distance measurement devices 300 when the vehicle 100 exists at an arbitrary position on the target route TR. Positions of the individual distance measurement devices 300 are fixed, and relative relations between the reference coordinate system Σr and device coordinate systems of the individual distance measurement devices 300 are previously known. Coordinate conversion matrixes for mutual conversion between coordinate values in the reference coordinate system Σr and coordinate values in the device coordinate systems of the individual distance measurement devices 300 are previously stored in the remote control device 200.

The remote control device 200 generates a control command for causing the vehicle 100 to travel along the target route TR, and sends the control command to the vehicle 100.

The vehicle 100 travels in accordance with the received control command. Accordingly, in the remote control system 10, it is possible to move the vehicle 100 from the first place PL1 to the second place PL2, by remote control, without using a conveying device such as a crane or a conveyor. Further, the remote control device 200 in the embodiment generates a control command for giving an instruction of the execution or stop of the acquisition of the three-dimensional point cloud data by the distance measurement device 300, and sends the control command to each distance measurement device 300.

Figure 2:
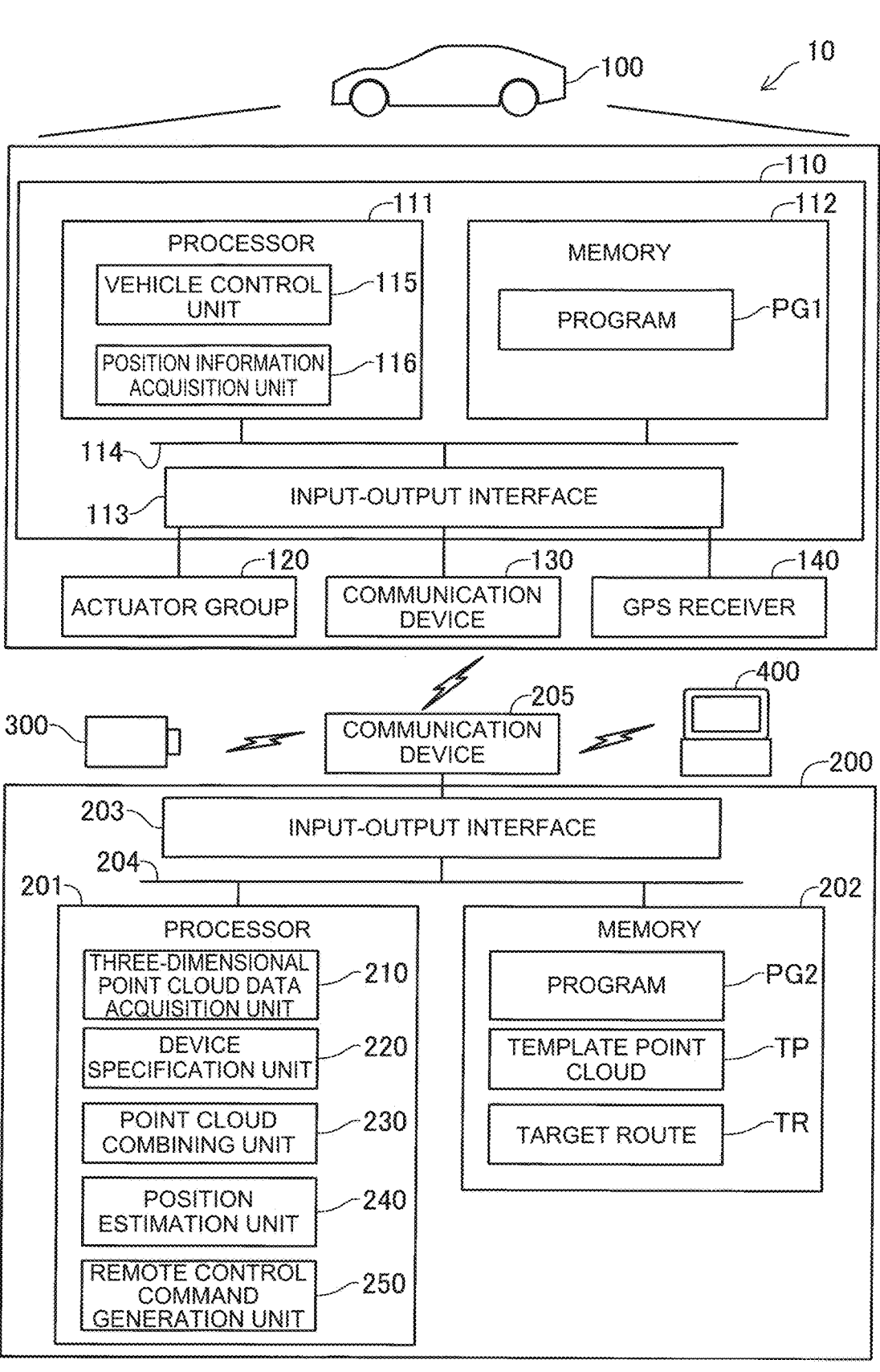
FIG. 2 is a block diagram showing the configuration of a vehicle and the remote control device.

FIG. 2 is a block diagram showing the configuration of the vehicle 100 and the remote control device 200. The vehicle 100 includes a vehicle control device 110 for controlling parts of the vehicle 100, an actuator group 120 that is driven under the control by the vehicle control device 110, a communication device 130 for communicating with the remote control device 200 by wireless communication, and a GPS receiver 140 for acquiring position information about the vehicle 100. In the embodiment, the actuator group 120 includes an actuator of a driving device for accelerating the vehicle 100, an actuator of a steering device for changing the moving direction of the vehicle 100, and an actuator of a braking device for decelerating the vehicle 100. The driving device includes a battery, a traveling motor that is driven by the electric power of the battery, and driving wheels that are rotated by the traveling motor. The actuator of the driving device includes the traveling motor. The actuator group 120 may further include an actuator for swinging a windshield wiper of the vehicle 100, an actuator for opening and closing a power window of the vehicle 100, and the like. Further, the vehicle 100 may include various physical body detectors such as a camera, a millimeter-wave radar, and a LiDAR.

The vehicle control device 110 is constituted by a computer including a processor 111, a memory 112, an input-output interface 113, and an internal bus 114. The processor 111, the memory 112, and the input-output interface 113 are connected through the internal bus 114, in a bi-directionally communicable manner. The input-output interface 113 is connected with the actuator group 120, the communication device 130, and the GPS receiver 140.

In the embodiment, the processor 111 functions as a vehicle control unit 115 and a position information acquisition unit 116, by executing a program PG1 that is previously stored in the memory 112. The vehicle control unit 115 controls the actuator group 120. When a driver rides in the vehicle 100, the vehicle control unit 115 can cause the vehicle 100 to travel, by controlling the actuator group 120 depending on the operation by the driver. In addition, regardless of whether the driver rides in the vehicle 100, the vehicle control unit 115 can cause the vehicle 100 to travel, by controlling the actuator group 120 depending on the control command that is sent from the remote control device 200. The position information acquisition unit 116 acquires the position information indicating the current place of the vehicle 100, using the GPS receiver 140. The position information acquisition unit 116 and the GPS receiver 140 may be excluded.

The remote control device 200 is constituted by a computer including a processor 201, a memory 202, an input-output interface 203, and an internal bus 204. The processor 201, the memory 202, and the input-output interface 203 are connected through the internal bus 204, in a bi-directionally communicable manner. The input-output interface 203 is connected with a communication device 205 for communicating with the vehicle 100 by wireless communication. The communication device 205 can communicate with the vehicle 100 by wireless communication, and can communicate with each distance measurement device 300 by wire communication or wireless communication.

In the embodiment, the processor 201 functions as a three-dimensional point cloud data acquisition unit 210, a device specification unit 220, a point cloud combining unit 230, a position estimation unit 240, and a remote control command generation unit 250, by executing a program PG2 that is previously stored in the memory 202.

The three-dimensional point cloud data acquisition unit 210 acquires the three-dimensional point cloud data measured by the distance measurement device 300. The three-dimensional point cloud data is data that indicates the three-dimensional position of a point cloud detected by the distance measurement device 300.

The device specification unit 220 specifies a distance measurement device 300 that is used in estimation processing of estimating the position and orientation of the vehicle 100, from the plurality of distance measurement devices 300. Hereinafter, the distance measurement device 300 specified by the device specification unit 220 is referred to as a "processing-object distance measurement device".

In the case where the device specification unit 220 specifies two or more distance measurement devices 300 as the processing-object distance measurement device, the point cloud combining unit 230 creates combined point cloud data by combining two or more pieces of three-dimensional point cloud data obtained by the two or more distance measurement devices 300. As the combining method for a plurality of pieces of three-dimensional point cloud data, for example, one of the following methods can be employed.

Combining Method M1 for Point Cloud

The coordinate values of the respective points in the three-dimensional point cloud data obtained by the respective distance measurement devices 300 are converted from the device coordinate systems of the distance measurement devices 300 to a particular coordinate system such as the reference coordinate system Σr, and the coordinate values after the conversion are summed.

On this occasion, in the case where there is a plurality of points among which the difference in the coordinate value after the conversion is equal to or smaller than an allowable error, the plurality of points is replaced with one representative point. The coordinate values of the representative point is representative values such as average values of the coordinate values of the plurality of points.

Combining Method M2 for Point Cloud (a) First combined point cloud data is created by performing the position adjustment by matching for first three-dimensional point cloud data and second three-dimensional point cloud data, employing a representative value such as the average value of position coordinates for corresponding points, and adding points having no corresponding point with no change.

(b) Second combined point cloud data is created by performing the same processing as the processing (a) for the first combined point cloud data and third three-dimensional point cloud data.

By repeating this processing, an arbitrary number of pieces of three-dimensional point cloud data can be combined. For the position adjustment by matching, for example, an iterative closest point algorithm (ICP algorithm) can be used. In terms of the processing speed, the above-described combining method M1 is preferable.

The position estimation unit 240 executes the estimation processing of estimating the position and orientation of the vehicle 100 using the three-dimensional point cloud data obtained through the measurement by the distance measurement device 300. In the embodiment, the position estimation unit 240 estimates the position and orientation of the vehicle 100, by executing template matching using a template point cloud TP stored in the memory 202. In the case where the three-dimensional point cloud data cannot be utilized, the position estimation unit 240 can estimate the position and orientation of the vehicle 100, using a traveling history of the vehicle 100 and the position information detected by the GPS receiver 140 that is equipped in the vehicle 100. The position estimation unit 240 may estimate only one of the position and orientation of the vehicle 100. In this case, the other of the position and orientation of the vehicle 100 is decided using the traveling history of the vehicle 100 or the like.

The remote control command generation unit 250 generates the control command for the remote control of the actuator group 120 of the vehicle 100, using the estimated position and orientation of the vehicle 100, and sends the control command to the vehicle 100. Thereby, it is possible to cause the vehicle 100 to travel by the remote control. The control command is a command for causing the vehicle 100 to travel along the target route TR stored in the memory 202. In the embodiment, the control command includes the acceleration and steering angle of the vehicle 100, as parameters. In another embodiment, the control command may include the velocity of the vehicle 100 as a parameter, instead of or in addition to the acceleration of the vehicle 100. The control command can be generated as a command including a driving or braking power and a turning angle. Alternatively, the remote control command generation unit 250 may generate the control command, as a command including at least one of the position and orientation of the vehicle 100 and a route along which the vehicle 100 will travel. Hereinafter, the control command is also referred to as a "traveling control signal". In addition to the traveling control signal, the remote control command generation unit 250 may generate and output control signals for controlling actuators that operate various auxiliary machines included in the vehicle 100 and various instruments such as a windshield wiper, a power window, and a lamp, for example. That is, the remote control command generation unit 250 may operate various instruments and various auxiliary machines, by remote control.

The process management device 400 manages the whole of the manufacturing process of the vehicle 100 in the factory. For example, when one vehicle 100 starts the traveling along the target route TR, individual information indicating the identification number, type, and others of the vehicle 100 is sent from the process management device 400 to the remote control device 200. The position of the vehicle 100 that is detected by the remote control device 200 is sent also to the process management device 400. The function of the process management device 400 may be implemented in the same device as the remote control device 200.

FIG. 3A is a flowchart showing a processing procedure of the traveling control of the vehicle 100 in the first embodiment. In step S1, the remote control command generation unit 250 acquires vehicle position information, using the detection result output from the external sensor. The vehicle position information is position information based on which the traveling control signal is generated. In the embodiment, the vehicle position information includes the position and orientation of the vehicle 100 in the global coordinate system of the factory. Specifically, in step S1, the remote control command generation unit 250 acquires the vehicle position information, using a pickup image acquired from a camera that is an external sensor. Further, in step S1, the remote control command generation unit 250 may acquire the vehicle position information, using the three-dimensional point cloud data acquired by the distance measurement device 300 and showing the vehicle 100, by the template matching in which the three-dimensional point cloud data and the previously prepared template point cloud TP are used.

In detail, in step S1, the remote control command generation unit 250 acquires the position of the vehicle 100, for example, by detecting the external form of the vehicle 100 from the pickup image, calculating the coordinates of a position measurement point of the vehicle 100 in a coordinate system for the pickup image, that is, in a local coordinate system, and converting the calculated coordinates into coordinates in the global coordinate system. For example, the external form of the vehicle 100 included in the pickup image can be detected by inputting the pickup image to a detection model for which artificial intelligence is used. For example, the detection model is prepared in the interior of the remote control system 10 or in the exterior of the remote control system 10, and is previously stored in the memory 202 of the remote control device 200. Examples of the detection model include a machine learning model for which learning have been performed such that one of semantic segmentation and instance segmentation is realized. As the machine learning model, for example, a convolutional neural network (referred to as a CNN, hereinafter) for which learning has been performed by a supervised learning using a learning data set can be used. For example, the learning data set includes a plurality of training images that includes the vehicle 100, and labels each of which indicates whether a region in the training image is a region for the vehicle 100 or a region other than the vehicle 100. At the time of the learning for the CNN, it is preferable to update parameters in the CNN so as to reduce the error between the output result by the detection model and the label, by a back propagation method. For example, the remote control command generation unit 250 can acquire the orientation of the vehicle 100, by performing the estimation based on the orientation of the mobile vector of the vehicle 100 that is calculated from the position change in the characteristic point of the vehicle 100 among frames of the pickup image, using an optical flow method.

In step S2, the remote control command generation unit 250 decides a target position to which the vehicle 100 will go from now. In the embodiment, the target position is expressed as X-Y-Z coordinates in the global coordinate system. The target route TR that is a path along which the vehicle 100 will travel is previously stored in the memory 202 of the remote control device 200. The path is shown by a node indicating a departure place, nodes indicating pass points, a node indicating a destination, and links connecting nodes. The remote control command generation unit 250 decides the target position to which the vehicle 100 will go from now, using the vehicle position information and the target route TR. The remote control command generation unit 250 decides the target position on the target route TR ahead of the current place of the vehicle 100.

In step S3, the remote control command generation unit 250 generates the traveling control signal for causing the vehicle 100 to travel to the decided target position. The remote control command generation unit 250 calculates the traveling velocity of the vehicle 100, from the transition of the position of the vehicle 100, and compares the calculated traveling velocity and a target velocity. As a whole, the remote control command generation unit 250 decides the acceleration such that the vehicle 100 is accelerated, when the traveling velocity is lower than the target velocity, and decides the acceleration such that the vehicle 100 is decelerated, when the traveling velocity is higher than the target velocity. Further, when the vehicle 100 is positioned on the target route TR, the remote control command generation unit 250 decides the steering angle and the acceleration such that the vehicle 100 does not depart from the target route TR. When the vehicle 100 is not positioned on the target route TR, in other words, when the vehicle 100 has departed from the target route TR, the remote control command generation unit 250 decides the steering angle and the acceleration such that the vehicle 100 returns to the target route TR.

In step S4, the remote control command generation unit 250 sends the generated traveling control signal to the vehicle 100. The remote control command generation unit 250 repeats the acquisition of the vehicle position information, the decision of the target position, the generation of the traveling control signal, the sending of the traveling control signal, and the like, in a predetermined cycle.

In step S5, the vehicle control unit 115 receives the traveling control signal sent from the remote control device 200. In step S6, the vehicle control unit 115 controls the actuator group 120 using the received traveling control signal, and thereby, causes the vehicle 100 to travel at the acceleration and steering angle that are shown in the traveling control signal. The vehicle control unit 115 repeats the receiving of the traveling control signal and the control of the actuator group 120, in a predetermined cycle. In the remote control system 10 in the embodiment, it is possible to cause the vehicle 100 to travel by remote control, and to move the vehicle 100 without using conveying equipment such as a crane or a conveyor.

Figure 3B:
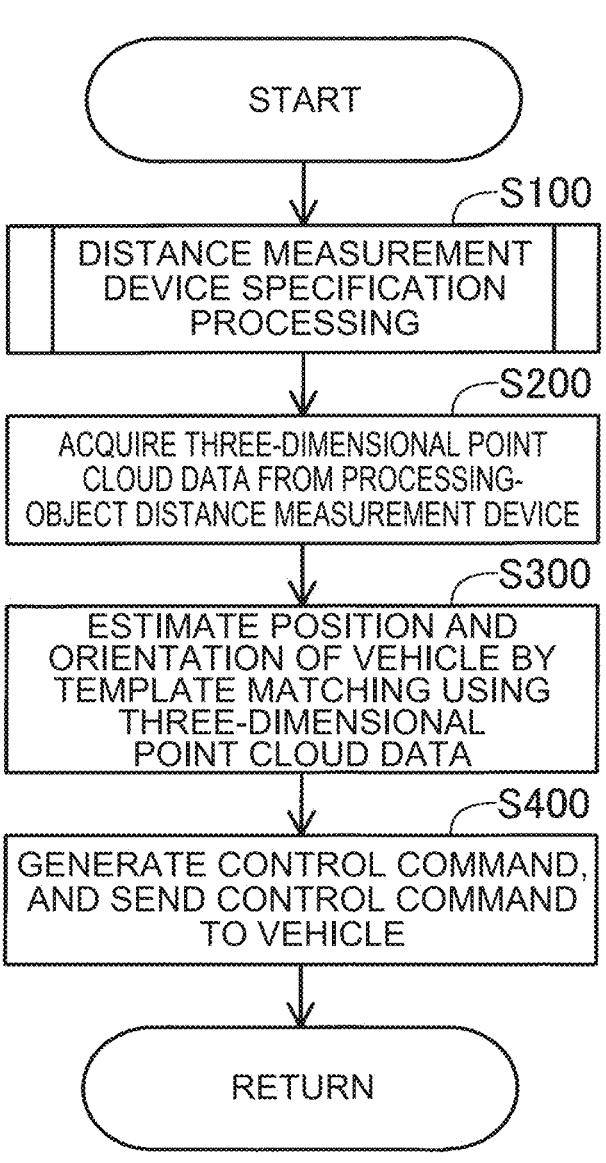
FIG. 3B is a flowchart showing a procedure of a processing by the remote control device in the first embodiment.

FIG. 3B is a flowchart showing a procedure of a processing by the remote control device 200 in the embodiment. This processing is started when the remote control device 200 is activated, and is repeatedly executed during the operation of the remote control device 200.

Figure 4:
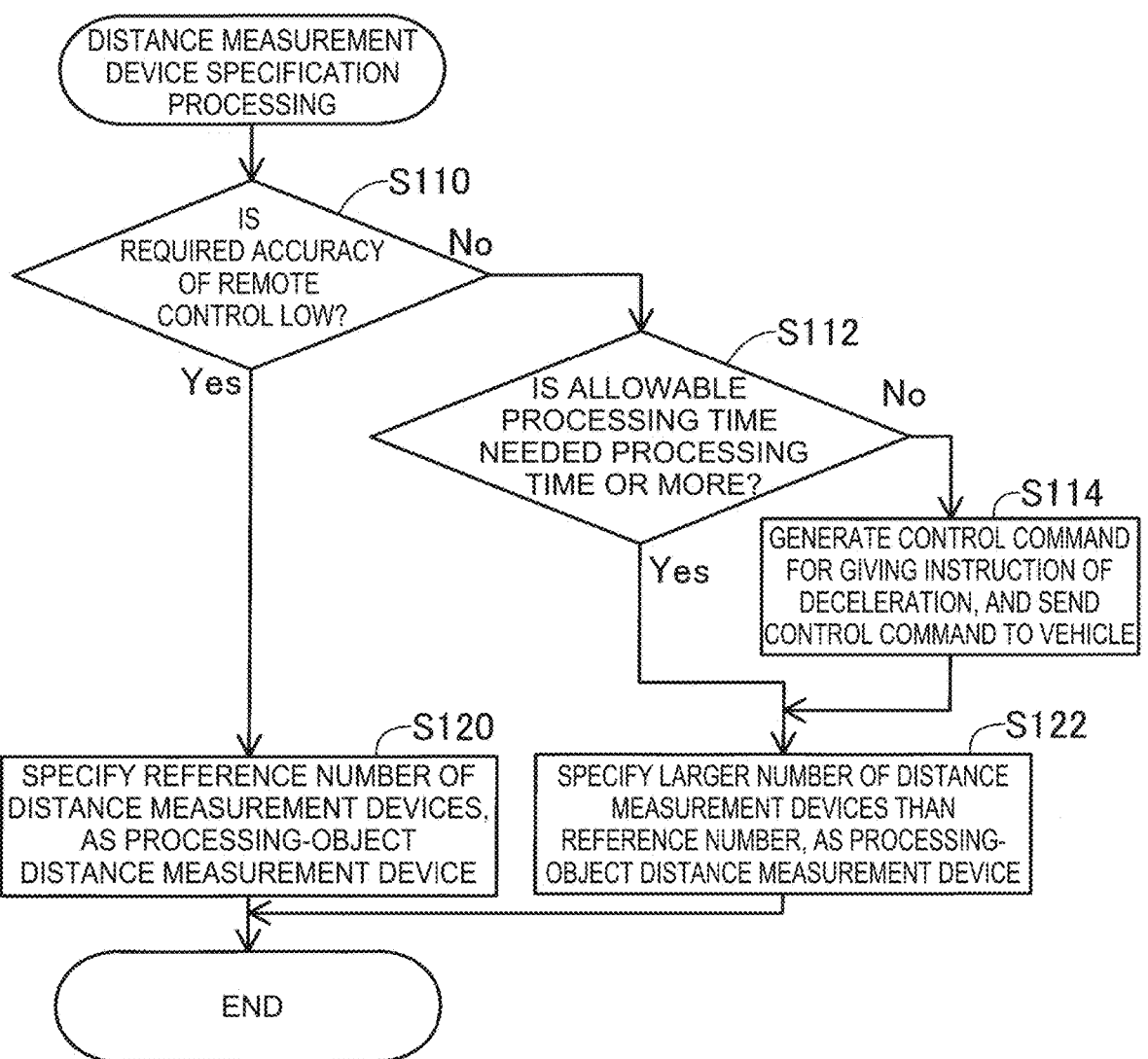
FIG. 4 is a flowchart showing a procedure of a distance measurement device specification processing in the first embodiment.

In step S100, the device specification unit 220 executes a distance measurement device specification processing. FIG. 4 is a flowchart showing a procedure of the distance measurement device specification processing in the first embodiment. In step S110 shown in FIG. 4, the device specification unit 220 determines whether the required accuracy of the remote control by the remote control device 200 is high. For example, this determination may be a determination about whether the required accuracy is higher than a reference level.

The required accuracy of the remote control is set for each of a plurality of sections that is set along the target route TR. For example, for a straight section or wide-width section on the traveling road SR, the allowable amount of the position deviation of the vehicle 100 is large, and therefore, the required accuracy is set so as to be low. On the other hand, for a straight section or narrow-width section on the traveling road SR, the allowable amount of the position deviation of the vehicle 100 is small, and therefore, the required accuracy is set so as to be high. Information relevant to the form and width of the traveling road SR may be previously stored in the memory 202.

Further, the required accuracy of the remote control may be set depending on the traveling state of the vehicle 100. For example, when the turning angle of the vehicle 100 is a preset threshold or more, the change amount of the orientation of the vehicle 100 in a predetermined time interval is large, and therefore, the required accuracy is set so as to be higher compared to when the turning angle is less than the threshold. Further, when an obstacle such as another vehicle or a person is detected around the vehicle 100 by an unillustrated physical body detection device, the required accuracy is set so as to be high, for avoiding the contact with the obstacle. The position of the vehicle 100 when the required accuracy is decided may be a position estimated in the last estimation processing or may be a position estimated from the traveling history of the vehicle 100.

As shown in FIG. 4, when it is determined that the required accuracy is low (step S110: Yes), the device specification unit 220 sets a reference number of distance measurement devices 300 as the processing-object distance measurement device. The "reference number" means the minimum number of distance measurement devices 300 necessary to specify the position of the vehicle 100, and in the embodiment, the reference number is previously set to one. The reference number is not limited to one, and may be set to two or more, or may be set to a different number for each section of the traveling road SR. After the end of the step, the device specification unit 220 ends the distance measurement device specification process.

On the other hand, when it is determined that the required accuracy is high (step S110: No), the device specification unit 220, in step S112, determines whether an allowable processing time in the current traveling situation of the vehicle 100 is equal to or more than a needed processing time for the estimation processing even if the number of distance measurement devices 300 is larger than the reference number as described later. The "allowable processing time" means a time that is set as a time during which failure does not occur in the remote control even if the processing time for the estimation processing is long. In the embodiment, the allowable processing time is set depending on the traveling situation of the vehicle 100. More specifically, when the processing time for the estimation processing can be sufficiently secured in the traveling situation of the vehicle 100, for example, before the start of the remote control, during the temporary stop of the vehicle 100, or during the low-velocity traveling of the vehicle 100, the allowable processing time is set so as to be long. This is because in this case, the vehicle 100 is stopped or the movement velocity is low, and therefore, there is a low possibility that the movement amount of the vehicle 100 during the execution of the estimation processing, in other words, during a period in which the position of the vehicle 100 cannot be acquired becomes large. Further, the allowable processing time may be previously set for each of the plurality of sections that is provided along the target route TR. In the embodiment, the "needed processing time for the estimation processing" is specified by previously performing experiments and the like, and is set as a processing time for the estimation processing using the three-dimensional point cloud data acquired from a preset number of distance measurement devices 300 that are larger than the reference number. Generally, the processing time for the estimation processing is longer as the number of distance measurement devices 300 that acquire the three-dimensional point cloud data is larger.

When the allowable processing time is the needed processing time or more (step S112: Yes), the device specification unit 220 executes step S122 described later. On the other hand, when the allowable processing time is less than the needed processing time (step S112: No), the remote control command generation unit 250 generates a control command for giving an instruction of the deceleration of the vehicle 100, and sends the control command to the vehicle 100, in step S114. In embodiment, the velocity in the instruction to the vehicle 100 is previously set to a velocity that is lower than a velocity at the time of ordinary conveyance. Thereby, the velocity of the vehicle 100 is decreased, and therefore, it is possible to secure a sufficient processing time for the estimation processing. After step S114, the device specification unit 220 executes step S122 described later.

In step S122, the device specification unit 220 sets a larger number of distance measurement devices 300 than the reference number, as the processing-object distance measurement device. Thereby, the three-dimensional point cloud data is acquired from a larger number of distance measurement devices 300 than the reference number, is synthesized, and is used, and thereby, it is possible to restrain the decrease in the accuracy of the estimation process, compared to when the three-dimensional point cloud data is acquired from only the reference number of distance measurement devices 300. Then, the distance measurement device specification process ends.

In step S200 shown in FIG. 3B, the position estimation unit 240 acquires the three-dimensional point cloud data from the processing-object distance measurement device specified in the above-described distance measurement device specification process. In the embodiment, the position estimation unit 240 sends a control command for giving an instruction of the execution of the acquisition of the three-dimensional point cloud data, to the processing-object distance measurement device, through the remote control command generation unit 250, and sends a control command for giving an instruction of the stop of the acquisition of the three-dimensional point cloud data, to the other distance measurement devices 300.

In step S300, the position estimation unit 240 estimates the position and orientation of the vehicle 100, by executing the matching between the acquired three-dimensional point cloud data and the template point cloud TP.

In step S400, the remote control command generation unit 250 generates the control command using the estimated position and orientation of the vehicle 100, and sends the control command to the vehicle 100. After the end of the step, the remote control device 200 executes step S100 again.

The above-described remote control device 200 in the first embodiment specifies the processing-object distance measurement device that is used in the estimation processing, and executes the estimation processing using the processing-object distance measurement device, and therefore, it is possible to prioritize one of the estimation accuracy and the processing speed depending on the situation.

Further, the device specification unit 220 increases the number of processing-object distance measurement devices, when the required accuracy of the remote control is high, and therefore, it is possible to restrain the decrease in estimation accuracy compared to when the required accuracy is high.

Further, the device specification unit 220 decides the number of processing-object distance measurement devices, depending on the traveling situation of the vehicle 100, and therefore, it is possible to prioritize one of the estimation accuracy and the processing speed depending on the traveling situation of the vehicle 100.

Further, when the number of processing-object distance measurement devices is increased, the remote control device 200 decreases the movement velocity of the vehicle 100, and thereby restrains the movement amount of the vehicle 100 during the execution of the estimation processing, and therefore, it is possible to reduce the possibility of the occurrence of a problem in the traveling of the vehicle 100.

B. Second Embodiment

Figure 5:
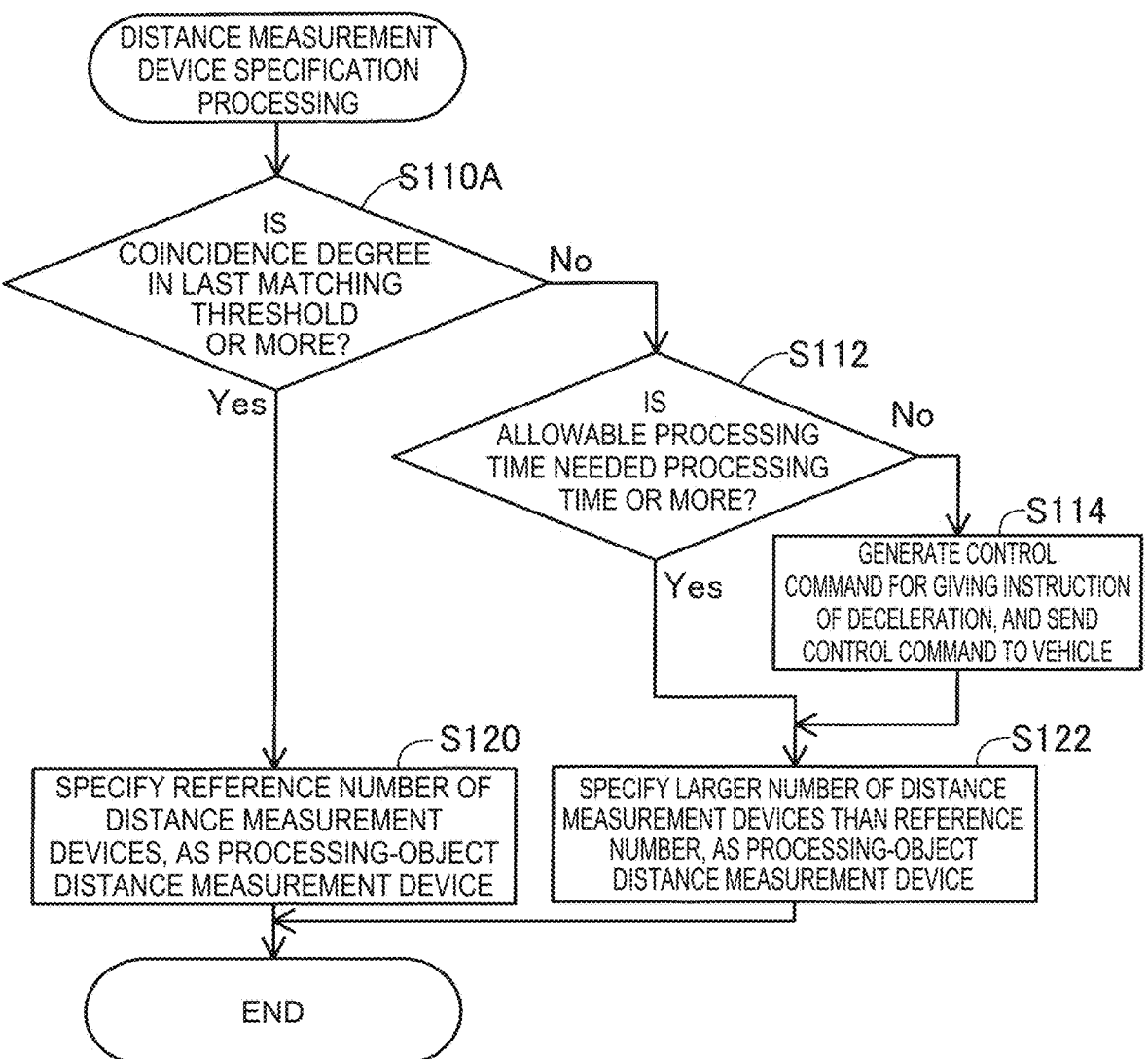
FIG. 5 is a flowchart showing a procedure of a distance measurement device specification processing in a second embodiment.

FIG. 5 is a flowchart showing a procedure of a distance measurement specification processing in a second embodiment. As shown in FIG. 5, a remote control device 200 in the second embodiment is different from the remote control device 200 in the first embodiment, in that step S110A is executed instead of step S110. The configurations of the system and the device are the same as those in the first embodiment. The configuration of the remote control device 200 in the second embodiment and the other procedures in the distance measurement device specification processing are the same as those in the first embodiment. Therefore, identical constitutions and identical procedures are denoted by identical reference characters, and detailed descriptions thereof are omitted.

In step S110A, the device specification unit 220 determines whether the coincidence degree of the matching in the last estimation processing is a preset threshold or more. The "coincidence degree of matching" means the degree of coincidence between the acquired three-dimensional point cloud data and the template point cloud TP in matching. As the coincidence degree, for example, the number of corresponding points found by matching from all points of the template point cloud TP, or the ratio of the number of the corresponding points can be used.

When the coincidence degree of the matching is the threshold or more (step S110A: Yes), the device specification unit 220 executes the above-described step S120. On the other hand, when the coincidence degree of the matching is less than threshold (step S110A: No), the device specification unit 220 executes the above-described step S112. In this way, when the coincidence degree of the matching is less than the threshold, the device specification unit 220 in the embodiment increases the number of processing-object distance measurement devices, compared to when the coincidence degree of the matching is the threshold or more.

In the above-described remote control device 200 in the second embodiment, the device specification unit 220 increases the number of processing-object distance measurement devices, when the coincidence degree of the matching is low, and therefore, it is possible to restrain the decrease in estimation accuracy when the coincidence degree of the matching is low.

C. Third Embodiment

Figure 6:
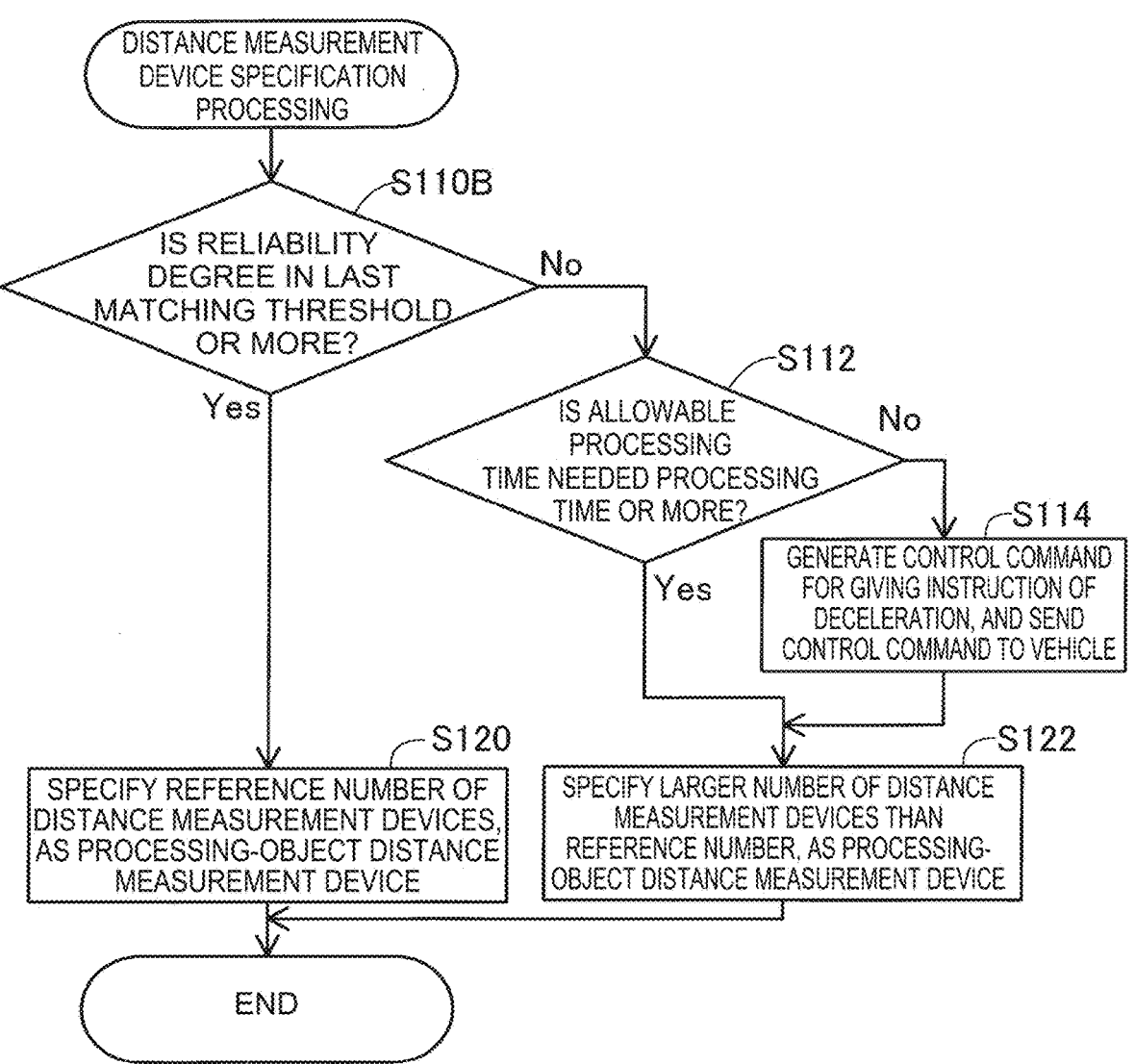
FIG. 6 is a flowchart showing a procedure of a distance measurement device specification processing in a third embodiment.

FIG. 6 is a flowchart showing a procedure of a distance measurement device specification processing in a third embodiment. As shown in FIG. 6, a remote control device 200 in the third embodiment is different from the remote control device 200 in the second embodiment, in that step S110B is executed instead of step S110A. The configuration of the remote control device 200 in the third embodiment and the other procedures in the distance measurement device specification processing are the same as those in the second embodiment. Therefore, identical constitutions and identical procedures are denoted by identical reference characters, and detailed descriptions thereof are omitted.

In step S110B, the device specification unit 220 determines whether the reliability degree of the matching in the last estimation processing is a preset threshold or more. The "reliability degree of matching" means the degree of the reliability or stability of the coincidence degree of the matching in a predetermined number of times of matching. For example, the average value of coincide degrees until the last matching in the predetermined number of times of matching can be used. The reliability degree of the matching is not limited to the average value, and may be calculated using various statistics such as median, standard deviation, and dispersion.

When the reliability degree of the matching is the threshold or more (step S110B: Yes), the device specification unit 220 executes the above-described step S120. On the other hand, when the reliability degree of the matching is less than threshold (step S110B: No), the device specification unit 220 executes the above-described step S112. In this way, when the reliability degree of the matching is less than the threshold, the device specification unit 220 in the embodiment increases the number of processing-object distance measurement devices, compared to when the reliability degree of the matching is the threshold or more. For example, even if the coincidence degree in the last matching is less than the threshold, the reliability degree is the threshold or more and the number of processing-object distance measurement devices is not increased, when the decrease in the coincidence degree has unexpectedly occurred in the predetermined number of times of the matching. The reason why the unexpected decrease in the coincidence degree of the matching occurs is thought to be because an obstacle such as a person or another vehicle passes through between the vehicle 100 and the distance measurement device 300.

In the above-described remote control device 200 in the third embodiment, the device specification unit 220 increases the number of processing-object distance measurement devices, when the reliability degree of the matching is low, and therefore, it is possible to restrain the decrease in estimation accuracy when the reliability degree of the matching is low. Further, the device specification unit 220 increases the number of processing-object distance measurement devices, when the reliability degree of the matching in the preset number of times of the estimation processing is the threshold or less, and therefore, it is possible to restrain the number of processing-object distance measurement devices from being frequently altered and restrain the processing by the remote control device 200 from being complicated, compared to a configuration in which the number of processing-object distance measurement devices is altered depending on the result of the matching in each estimation processing.

D. Fourth Embodiment

Figure 7:
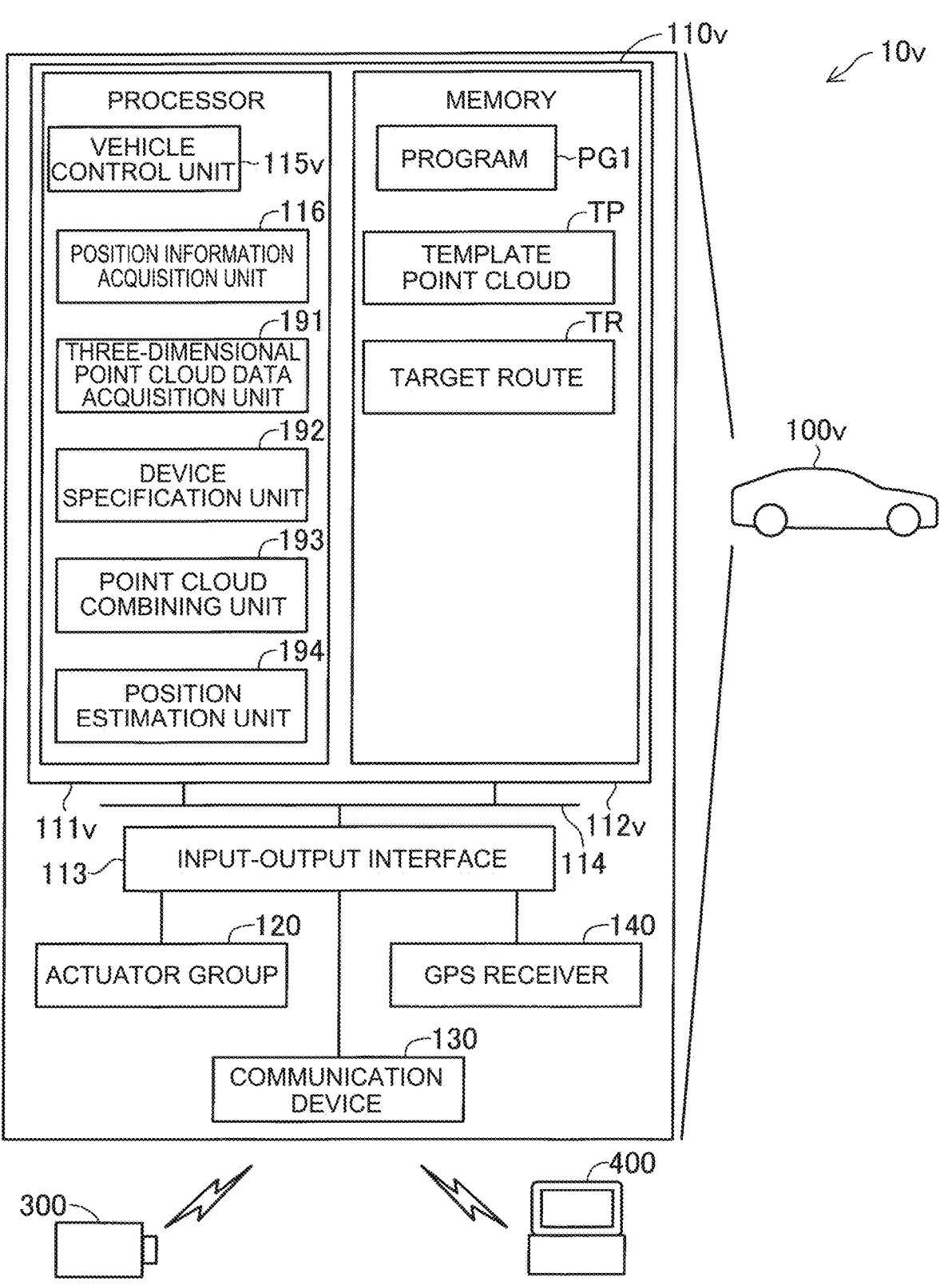
FIG. 7 is a block diagram showing the configuration of a control system in the third embodiment.

FIG. 7 is an explanatory diagram showing a schematic configuration of a remote control system 10v in a fourth embodiment. The embodiment is different from the first embodiment, in that the remote control system 10v does not include the remote control device 200. Further, a vehicle 100v in the embodiment can travel by the autonomous control of the vehicle 100v. The other configuration is the same as that in the first embodiment, unless otherwise mentioned.

In the embodiment, a processor 111v of a vehicle control device 110v functions as a vehicle control unit 115v, the position information acquisition unit 116, a three-dimensional point cloud data acquisition unit 191, a device specification unit 192, a point cloud combining unit 193, and a position estimation unit 194, by executing a program PG1 stored in a memory 112v. The vehicle control unit 115v acquires the output result of the sensor, generates a traveling control signal using the output result, and outputs the generated traveling control signal to operate the actuator group 120. Thereby, the vehicle control unit 115v can cause the vehicle 100v to travel by the autonomous control. In the embodiment, the template point cloud TP and the target route TR are previously stored in the memory 112v, in addition to the program PG1. The vehicle control device 110v in the embodiment corresponds to the "control device" in the present disclosure.

Figure 8:
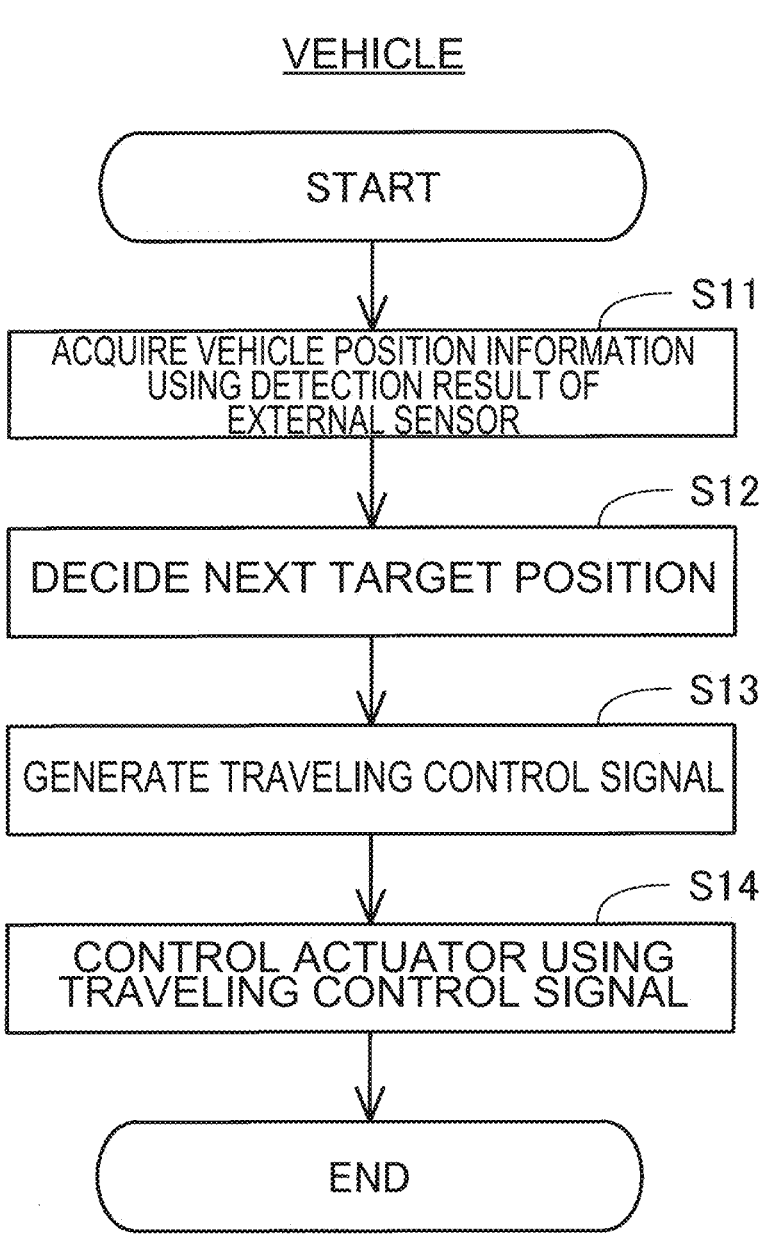
FIG. 8 is a flowchart showing a procedure of a traveling control in the third embodiment.

FIG. 8 is a flowchart showing a processing procedure of the traveling control of the vehicle 100v in the second embodiment. In step S11, the vehicle control unit 115v acquires the vehicle position information, using the detection result output from the external sensor. In step S12, the vehicle control unit 115v decides a target position to which the vehicle 100v will go from now. In step S13, the vehicle control unit 115v generates a traveling control signal for causing the vehicle 100v to travel to the decided target position. In step S14, the vehicle control unit 115v controls the actuator group 120 using the generated traveling control signal, and thereby, causes the vehicle 100v to travel in accordance with parameters shown in the traveling control signal. The vehicle control unit 115v repeats the acquisition of the vehicle position information, the decision of the target position, the generation of the traveling control signal, and the control of the actuator, in a predetermined cycle. In the remote control system 10v in the embodiment, it is possible to cause the vehicle 100v to travel by the autonomous control of the vehicle 100v, even if the remote control of the vehicle 100v is not performed by the remote control device 200.

E. Other Embodiments (E1) In the above embodiments, the velocity in the instruction to the vehicle 100 is previously set in step S114 of the distance measurement device specification processing, but the present disclosure is not limited to this. The velocity in the instruction to the vehicle 100 may be set depending on the magnitude of the difference between the allowable processing time and the needed processing time. By this setting method, the deceleration amount of the vehicle 100 can be set to a minimum necessary amount, and therefore, it is possible to restrain the increase in conveyance time due to the deceleration of the vehicle 100.

(E2) In the above embodiments, the position estimation unit 240 acquires the three-dimensional point cloud data from the processing-object distance measurement device specified in the distance measurement device specification processing, but the present disclosure is not limited to this. The position estimation unit 240 may acquire the three-dimensional point cloud data from all distance measurement devices 300, and may estimate the position and orientation of the vehicle 100, using only the three-dimensional point cloud data that is of the three-dimensional point cloud data acquired from all distance measurement devices 300 and that is acquired from the processing-object distance measurement device specified in the distance measurement device specification processing. In this mode, it is not necessary to send the control command for giving the instruction of the execution or stop of the acquisition of the three-dimensional point cloud data to each distance measurement device 300 depending on the change in the processing-object distance measurement device, and therefore, it is possible to restrain the processing by the remote control device 200 from being complicated.

(E3) In the above first embodiment, the processing from the acquisition of the vehicle position information to the generation of the traveling control signal is executed by the remote control device 200. However, at least a part of the processing from the acquisition of the vehicle position information to the generation of the traveling control signal may be executed by the vehicle 100. For example, the following modes (1) to (3) may be adopted.

(1) The remote control device 200 may acquire the vehicle position information, may decide the target position to which the vehicle 100 will go from now, and may generate a path from the current place of the vehicle 100 that is shown in the acquired vehicle position information to the target position. The remote control device 200 may generate a path to a target position between the current place and a destination, or may generate a path to the destination. The remote control device 200 may send the generated path to the vehicle 100. The vehicle 100 may generate the traveling control signal such that the vehicle 100 travels on the path received from the remote control device 200, and may control the actuator group 120 using the generated traveling control signal.

(2) The remote control device 200 may acquire the vehicle position information, and may send the acquired vehicle position information to the vehicle 100. The vehicle 100 may determine the target position to which the vehicle 100 will go from now, may generate the path from the current place of the vehicle 100 that is shown in the received vehicle position information to the target position, may generate the traveling control signal such that the vehicle 100 travels on the generated path, and may control the actuator group 120 using the generated traveling control signal.

(3) In the above modes (1) and (2), an internal sensor may be equipped in the vehicle 100, and the detection result output from the internal sensor may be used for at least one of the generation of the path and the generation of the traveling control signal. The internal sensor is a sensor that is equipped in the vehicle 100. For example, the internal sensor can include a sensor that detects the motion state of the vehicle 100, a sensor that detects the operating state of each part of the vehicle 100, and a sensor that detects the environment around the vehicle 100. Specifically, for example, the internal sensor can include a camera, a LIDAR, a millimeter-wave radar, an ultrasonic sensor, a GPS sensor, an acceleration sensor, a gyroscope sensor, and the like. For example, in the above mode (1), the remote control device 200 may acquire the detection result of the internal sensor, and may reflect the detection result of the internal sensor in the path at the time of the generation of the path. In the above mode (1), the vehicle 100 may acquire the detection result of the internal sensor, and may reflect the detection result of the internal sensor in the traveling control signal at the time of the generation of the traveling control signal. In the above mode (2), the vehicle 100 may acquire the detection result of the internal sensor, and may reflect the detection result of the internal sensor in the path at the time of the generation of the path. In the above mode (2), the vehicle 100 may acquire the detection result of the internal sensor, and may reflect the detection result of the internal sensor in the traveling control signal at the time of the generation of the traveling control signal.

(E4) In the above fourth embodiments, the internal sensor may be equipped in the vehicle 100v, and the detection result output from the internal sensor may be used for at least one of the generation of the path and the generation of the traveling control signal. For example, the vehicle 100v may acquire the detection result of the internal sensor, and may reflect the detection result of the internal sensor in the path at the time of the generation of the path. The vehicle 100v may acquire the detection result of the internal sensor, and may reflect the detection result of the internal sensor in the traveling control signal at the time of the generation of the traveling control signal. The vehicle 100v may acquire a target arrival time and congestion information from the exterior of the vehicle 100v, and may reflect the target arrival time and the congestion information in at least one of the path and the traveling control signal.

(E5) In the above first embodiment, the remote control device 200 automatically generates the traveling control signal that is sent to the vehicle 100. However, the remote control device 200 may generate the traveling control signal that is sent to the vehicle 100, in accordance with the operation by an external operator in the exterior of the vehicle 100. For example, the external operator may operate a maneuvering device including a display device that displays the pickup image output from the external sensor, a steering wheel, accelerator pedal and brake pedal for remotely operating the vehicle 100, and a communication device for communicating with the remote control device 200 by wire communication or wireless communication, and the remote control device 200 may generate the traveling control signal depending on the operation to the maneuvering device.

(E6) In the above embodiments, the vehicle 100 only needs to have a configuration in which the vehicle 100 can move by unmanned driving, and for example, may have a platform that has a configuration described below. Specifically, the vehicle 100 only needs to include at least the vehicle control device 110 and the actuator group 120, for exerting the three functions of "running", "turning", and "stopping" by unmanned driving. In the case where the vehicle 100 acquires information from the exterior for unmanned driving, the vehicle 100 only needs to further include the communication device 130. That is, the vehicle 100 that can move by unmanned driving does not need to be provided with a driver's seat and at least some of interior components such as a dashboard, does not need to be provided with at least some of exterior components such as a bumper and a fender, and does not need to be provided with a bodyshell. In this case, the other components such as the bodyshell may be attached to the vehicle 100 before the vehicle 100 is shipped from the factory, or the other components such as the bodyshell may be attached to the vehicle 100 after the vehicle 100 is shipped from the factory in a state where the other components such as the bodyshell have not been attached to the vehicle 100. Components may be attached from arbitrary directions such as the upper side, lower side, front side, rear side, right side and left side of the vehicle 100, and may be attached from the same direction as each other, or may be attached from different directions from each other. Also in the case of the platform, the position decision can be performed similarly to the vehicle 100 in the first embodiment.

(E7) The vehicle 100 may be manufactured by combining a plurality of modules. The module means a unit constituted by a plurality of components that is collected depending on a site or function of the vehicle 100. For example, the platform of the vehicle 100 may be manufactured by combining a front module configuring a front portion of the platform, a central module configuring a central portion of the platform, and a rear module configuring a rear portion of the platform. The number of modules that constitute the platform is not limited to three, and may be two or less or may be four or more. Further, components constituting a portion of the vehicle 100 that is different from the platform may be modularized in addition to or instead of components constituting the platform. Further, each module may include arbitrary exterior components such as bumper and a grill, and arbitrary interior components such as a seat and a console. Further, without being limited to the vehicle 100, an arbitrary kind of movable body may be manufactured by combining a plurality of modules. For example, such a module may be manufactured by joining a plurality of components by welding, a fixture or the like, or may be manufactured by integrally molding at least some of components constituting the module, as one component, by casting. The molding technique of integrally molding one component, particularly a relatively large component is also called giga cast or mega cast. For example, the above front module, the above central module, and the above rear module may be manufactured by the giga cast.

(E8) The conveyance of the vehicle 100 using the traveling of the vehicle 100 by unmanned driving is also called "self-traveling conveyance". Further, the configuration for realizing the self-traveling conveyance is also called a "vehicle remote-control autonomous-traveling conveyance system". Further, the production method of producing the vehicle 100 using the self-traveling conveyance is also called "self-traveling production". In the self-traveling production, at least a part of the conveyance of the vehicle 100 is realized by self-traveling conveyance, in a factory where the vehicle 100 is manufactured, for example.

(E9) Some or all of functions and processes realized by software in the above embodiments may be realized by hardware. Further, some or all of functions and processes realized by hardware may be realized by software. As the hardware for realizing various functions in the above embodiments, for example, various circuits such as an integrated circuit and a discrete circuit may be used.

The present disclosure is not limited to the above-described embodiments, and can be realized as various configurations without departing from the spirit of the present disclosure. For example, technical characteristics in the embodiments that correspond to technical characteristics in the modes described in SUMMARY can be replaced or combined when appropriate, for solving some or all of the above-described problems or for achieving some or all of the above-described effects. Further, the technical characteristics can be removed when appropriate, except technical characteristics that are described to be essential in the present specification.

What is claimed is:

1. A remote control device comprising:
one or more memories, and
one or more processors in communication with the one or more memories, configured to perform processes including:
determining whether an accuracy of remote control of a movable body by the remote control device is higher than a reference level;
based upon the determination that the accuracy of the remote control is higher than the reference level, determining whether an allowable processing time of a movable body is higher than a needed processing time;
based upon the determination that the allowable processing time of the movable body is higher than the needed processing time, specifying a first number of one or more processing-object distance measurement devices from a plurality of distance measurement devices, wherein the first number is greater than a reference number, each of the one or more processing-object distance measurement devices is a distance measurement device that is used in estimating at least one of a position and an orientation of the movable body, and each of the plurality of distance measurement devices is an external sensor that is positioned in an exterior of the movable body;

executing the estimating using three-dimensional point cloud data that is obtained through measurement by the each of the one or more processing-object distance measurement devices; and sending a control command to the movable body, wherein the control command is for the remote control of the movable body, and the control command uses the at least one of a position and an orientation of the movable body estimated by the each of the one or more processing-object distance measurement devices.

2. The remote control device according to claim 1, wherein the processes further include increasing the first number of one or more processing-object distance measurement devices, when the accuracy of the remote control is lower than the reference level.

3. The remote control device according to claim 1, wherein the processes further include deciding the number of one or more processing-object distance measurement devices depending on a traveling situation of the movable body.

4. The remote control device according to claim 1, wherein the processes further include:

executing the estimating by performing matching between the three-dimensional point cloud data and a template point cloud; and when a coincidence degree of the matching between the three-dimensional point cloud data and the template point cloud is less than a threshold, increasing the first number of one or more processing-object distance measurement devices, wherein the first number is greater than a second number of the processing-object distance measurement devices in a last matching.

5. The remote control device according to claim 1, wherein the processes further include:

repeatedly executing the estimating by performing matching between the three-dimensional point cloud data and a template point cloud; and when a reliability degree of the matching in a preset number of times of the estimating by performing matching between the three-dimensional point cloud data and a template point cloud is less than a threshold, increasing the first number of one or more processing-object distance measurement devices, wherein the first number is greater than a third number of the processing-object distance measurement devices in a last matching.

6. The remote control device according to claim 2, wherein the processes further include decreasing a movement velocity of the movable body, when the first number of one or more processing-object distance measurement devices is increased.

7. The remote control device according to claim 1, wherein the reference number is determined based on the determination that the accuracy of the remote control is lower than the reference level.

8. A control device comprising:

one or more memories, and one or more processors in communication with the one or more memories, configured to perform processes including:

determining whether an accuracy of remote control of a movable body by the remote control device is higher than a reference level;

based upon the determination that the accuracy of the remote control is higher than the reference level, determining whether an allowable processing time of a movable body is higher than a needed processing time;

based upon the determination that the allowable processing time of the movable body is higher than the needed processing time, specifying a first number of one or more processing-object distance measurement devices from a plurality of distance measurement devices, wherein the first number is greater than a reference number, each of the one or more processing-object distance measurement devices is a distance measurement device that is used in estimating at least one of a position and an orientation of the movable body, and each of the plurality of distance measurement devices is an external sensor that is positioned in an exterior of the movable body;

executing the estimating using three-dimensional point cloud data that is obtained through measurement by the each of the one or more processing-object distance measurement devices; and sending a control command to the movable body, wherein the control command is for the remote control of the movable body, and the control command uses the at least one of a position and an orientation of the movable body estimated by the each of the one or more processing-object distance measurement devices.

9. A control method for controlling a movable body, the control method comprising:

determining whether an accuracy of remote control of a movable body by the remote control device is higher than a reference level;

based upon the determination that the accuracy of the remote control is higher than the reference level, determining whether an allowable processing time of a movable body is higher than a needed processing time;

based upon the determination that the allowable processing time of the movable body is higher than the needed processing time, specifying, by the one or more processors, a first number of one or more processing-object distance measurement devices from a plurality of distance measurement devices, wherein the first number is greater than a reference number, each of the processing-object distance measurement devices is a distance measurement device that is used in estimating at least one of a position and an orientation of the movable body, and each of the plurality of distance measurement devices is an external sensor that is positioned in an exterior of the movable body:

executing, by the one or more processors, the estimation processing using three-dimensional point cloud data that is obtained through measurement by the each of the one or more processing-object distance measurement devices; and sending a control command to the movable body, wherein the control command is for the remote control of the movable body, and the control command uses the at least one of a position and an orientation of the movable body estimated by the each of the one or more processing-object distance measurement devices.

* * * * *